United States Patent
Peterson et al.

(10) Patent No.: US 11,613,621 B2
(45) Date of Patent: Mar. 28, 2023

(54) EXPANDABLE GRAPHITE FLAME RETARDANT COATING FOR POLYURETHANE AND LATEX FOAM

(71) Applicant: L & P PROPERTY MANAGEMENT COMPANY, South Gate, CA (US)

(72) Inventors: Courtney Peterson, Fort Smith, AR (US); Heidi Stojanovic, Fort Smith, AR (US); Aubrey Scherrey, Fort Smith, AR (US); Mark Crawford, Alma, AR (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 16/415,962

(22) Filed: May 17, 2019

(65) Prior Publication Data

US 2020/0362133 A1    Nov. 19, 2020

(51) Int. Cl.
*C08J 9/36* (2006.01)
*C09D 5/18* (2006.01)
*C09D 1/00* (2006.01)

(52) U.S. Cl.
CPC .............. *C08J 9/365* (2013.01); *C09D 1/00* (2013.01); *C09D 5/185* (2013.01); *C08J 2205/06* (2013.01); *C08J 2321/02* (2013.01); *C08J 2375/04* (2013.01); *Y10T 428/249958* (2015.04); *Y10T 428/249987* (2015.04); *Y10T 428/249991* (2015.04)

(58) Field of Classification Search
CPC .... C08J 9/365; C08J 2205/06; C08J 2375/04; C09D 5/185; C09D 1/00; Y10T 428/249987; Y10T 428/249958; Y10T 428/249991
See application file for complete search history.

(56) References Cited

U.S. PATENT DOCUMENTS

| | | | | |
|---|---|---|---|---|
| 2,917,476 A * | 12/1959 | Peterson | ............... | C09D 5/185 |
| | | | | 523/179 |
| 5,721,281 A * | 2/1998 | Blount | ...................... | C08J 9/40 |
| | | | | 521/142 |
| 9,097,011 B1 * | 8/2015 | Barone | .................... | B05D 1/02 |
| 2010/0087115 A1* | 4/2010 | Davis | ..................... | D06M 11/45 |
| | | | | 442/136 |
| 2011/0006579 A1* | 1/2011 | Hannig | .................. | C08G 18/10 |
| | | | | 297/452.1 |
| 2014/0141161 A1* | 5/2014 | Bruchertseifer | ....... | C08G 18/10 |
| | | | | 427/209 |
| 2017/0037215 A1 | 2/2017 | Crawford et al. | | |
| 2017/0067248 A1 | 3/2017 | Vairo et al. | | |
| 2018/0355140 A1 | 12/2018 | Song et al. | | |
| 2019/0145098 A1* | 5/2019 | Geyer | ................... | C09K 21/02 |
| | | | | 252/606 |

FOREIGN PATENT DOCUMENTS

| | | | | |
|---|---|---|---|---|
| EP | 2801464 A1 * | 11/2014 | ......... | B29C 44/5681 |
| WO | WO-2014187496 A1 * | 11/2014 | ............ | C09D 5/185 |
| WO | 2018204911 A1 | 11/2018 | | |

OTHER PUBLICATIONS

U.S. Patent and Trademark Office; Search Report and Written Opinion in related International Patent Application No. PCT/US2020/032426 dated Aug. 11, 2020; 12 pages.

* cited by examiner

*Primary Examiner* — Hai Vo
(74) *Attorney, Agent, or Firm* — Wood Herron & Evans LLP

(57) ABSTRACT

A flexible foam composition includes a flexible foam body having a surface, which flexible foam is polyurethane and/or latex flexible foam, and an expandable graphite layer on the surface or within the foam surface adjacent to the surface. The flexible foam composition with the expandable graphite layer imparts improved flame retardant properties to the composition.

19 Claims, No Drawings

EXPANDABLE GRAPHITE FLAME RETARDANT COATING FOR POLYURETHANE AND LATEX FOAM

TECHNICAL FIELD

The invention relates to flexible foams such as open-celled or closed-cell flexible polyurethane foams and open-celled flexible latex foams, and more particularly relates to flexible foam having flame retardants incorporated therein.

TECHNICAL BACKGROUND

Polyurethane foams are typically made from the reaction of one or more polyols with one or more isocyanates in the presence of gelation and blowing catalysts and other additives. They are used in a wide variety of industrial and house-hold items ranging from interior components of airplanes and automobiles to residential appliances, furniture, bedding, and bath items. Latex foams are similar and may be made from natural or synthetic latex.

Foams such as open-celled polyurethane flexible foams, partially open-celled flexible foams, and especially latex foams are highly flammable by nature. Over the years, various flame retardant (FR) additives and other materials have been incorporated into the foam making process to improve their flame retardant performance for the end uses of the foams. FR additives are activated by the presence of an ignition source and are designed to prevent or slow the further development of ignition by a variety of different physical and chemical methods. Phosphorus compounds are known flame retardant additives for polyurethane flexible foams. Phosphorus-containing polyols that become chemically bonded to the polyurethane matrix are also known flame retardants. The covalent linkage prevents migration and leaching of the organophosphorus compound. Furniture manufacturers typically meet flame retardant requirements with halogenated organic flame retardants. Aluminum trihydrate ($Al_2O \cdot 3H_2O$) is also a widely used flame retardant.

Despite these efforts, there still remains a need to develop flexible foams, particularly polyurethane foams, latex foams, and similar flexible foams having improved flame retardant properties. Furthermore, prior efforts to improve the flame retardancy of flexible foams used high loadings of flame retardants throughout the foam which can cause undesirable property changes in the foams including, but not necessarily limited to, declining static and dynamic fatigue properties, harsh and coarse feel, and/or stiffness.

SUMMARY

There is provided, in a non-restrictive embodiment, a flexible foam composition that includes a flexible foam body having a surface or more than one surface, where the flexible foam body includes polyurethane flexible foam, latex flexible foam, and combinations of these. The flexible foam composition also includes an expandable graphite layer on at least one of the surfaces or at least partially within the flexible foam body adjacent the surface.

DETAILED DESCRIPTION

It has been discovered that flame retardant properties in a polyurethane or latex foam cushion, mattress, or pillow can be improved by using at least one flame retardant surface-infused coating layer located on, under, or within a cushion foam or mattress, wherein the flame retardant surface-infused coating layer is produced from a mixture containing expandable graphite and a binder. This binder can be a solid adhesion agent, an aqueous solvent, an inorganic solvent, an organic solvent, an emulsion, or combinations thereof. The coating can also comprise optional plasticizing agents, optional salts, optional extenders or pigments, optional stabilizers, and other optional active and/or inactive materials.

In general, polyurethane foams are comprised of opened-cell, partially opened-cell, or closed-cell polyurethane foams such as polyether polyurethane foams and polyester polyurethane flexible foams. Molded polyurethane foams may be flexible, semi-rigid, or rigid polyurethane foams. All flexible foams herein have cells. However, in one non-limiting embodiment, rigid or semi-rigid foams are not included herein.

Latex foams are comprised of natural latex and/or synthetic latex and are produced by introducing air or other gas into a latex to provide a froth or foam, gelling the froth or foam and vulcanizing the resulting gelled froth or foam. Gas is conventionally introduced into latex in one of two ways; either by mechanically whipping or beating air into the latex or by incorporating one or more gas-generating or gas-evolving compounds into the latex to chemically froth it. Gelling or coagulation of latex foam is usually achieved in one of two ways. One of these is including a gelling agent with the latex foam, which is normally a delayed-action gelling agent. The other gelling method is gelling or coagulation by freezing, or freezing in conjunction with a chemical gelling agent.

A "latex" is a stable emulsion of polymer particles in an aqueous medium whose origin can be either natural and/or synthetic, where natural latex is a milky fluid found in many plants and synthetic latex can be made by polymerizing one or more monomers in the presence of a surfactant to create an emulsion. A monomer is defined as any molecule that can undergo polymerization, that is, a process of chemically reacting monomers together to produce polymer chains or three-dimensional networks of repeating, random, block or co-block units.

A "flame retardant" is a material whose function it is to interfere chemically or physically with the combustion process. This could include halogen, inorganic, nitrogen, intumescent, or phosphorous-based materials and possibly combinations thereof, such as, but not limited to, expandable graphite—in the particular methods and compositions described herein, but also chloride flame retardants (CFRs) such as but not limited to polyvinyl chloride (PVC), chlorendic anhydride, tris(1,3-dichloro-2-propyl) phosphate (TDCPP), and tris(2-chloro-iso-propyl) phosphate (TCIPP), bromide flame retardants (BFRs) such as, but not limited to, polybrominated diphenyl ethers (PBDE), brominated cyclohydrocarbons, decabromodiphenyl ether (Deca-BDE or DeBDE), hexabromocyclododecane (HBCD or HBCDD), tetrabromobisphenol A (TBBPA or TBBP-A), polychlorinated biphenyl (PCB), melamine or melamine-based products, aluminum hydroxide, aluminum trihydrate, magnesium hydroxide (brucite), huntite, hydromagnesite, tetrabromophthalic anhydride (TBPA), spumific compounds (that is, chemicals that decompose when heated and produce large amounts of gas), anhydride-based polymers, and combinations thereof.

"Expandable graphite" is herein defined as an intercalated synthesized compound of graphite that expands or exfoliates when exposed to a rapid increase in temperature.

An "adhesion agent" is herein defined as any non-metallic substance applied to physically or chemically bind expandable graphite and optionally other active and inactive materials to a surface. This surface in the scope of the methods and compositions described herein is any form of polyurethane or latex foam as defined above, and in particular the outside or outermost part of the foam.

A "solvent" in this instance is defined as organic or inorganic, polar aprotic, polar protic, non-polar, covalent, and/or non-covalent and may include but is not necessarily limited to water, water-based emulsions; volatile organic solvents having a boiling point of less than about 392° F. (about 200° C.) at 760 mmHg such as, but not limited to acetonitrile, acrylonitrile, 3-chloropropene (allyl chloride), benzene, benzyl chloride, bromodichloromethane, bromoethane (ethyl bromide), bromoform, bromomethane, 1,3-butadiene, n-butane, chlorobenzene, chloroethane, chloroform, chloromethane, carbon disulfide, carbon tetrachloride, 2-chlorotoluene, cyclohexane, dibromochloromethane, 1,2-dibromoethane, 1,2-dichlorobenzene, 1,3-dichlorobenzene, 1,4-dichlorobenzene, FREON® 12 (dichlorodifluoromethane), 1,1-dichloroethane, 1,2-dichloroethane, 1,1-dichloroethene, 1,2-dichloroethene (cis), 1,2-dichloroethene (trans), 1,2-dichloropropane, 1,3-dichloropropene (cis), 1,3-dichloropropene (trans), FREON® 114 (1,2-dichlorotetrafluoroethane), 1,4-dioxane, ethyl acetate, ethanol, ethylbenzene, 4-ethyltoluene, n-heptane, hexachloro-1,3-butadiene, n-hexane, isopropyl alcohol (2-propanol), isopropylbenzene (cumene), methylene chloride, 2-hexanone (MBK), 2-butanone (MEK), 4-methyl-2-pentanone (MIBK), methyl methacrylate, methyl-tertbutyl ether (MTBE), naphthalene, propylene, styrene, tertiary butyl alcohol (TBA), 1,1,2,2-tetrachloroethane, tetrachloroethene, tetrahydrofuran, toluene, 1,2,4-trichlorobenzene, 1,1,1-trichloroethane, 1,1,2-trichloroethane, trichloroethene, FREON® 11 (trichlorofluoromethane), FREON® 113 (1,1,2-trichloro-1,1,2-trifluoroethane), 1,2,4-trimethylbenzene, 1,3,5-trimethylbenzene, 2,2,4-trimethylpentane (isooctane), vinyl acetate, bromoethene (vinyl bromide), vinyl chloride, xylene (para and meta), xylene (ortho), xylene(mixed isomers), and combinations thereof. FREON® is a registered trademark of The Chemours Company. Alternatively, the organic solvent may be a semi-volatile solvent, comprising a boiling point between about 200° C. to about 500° C. at 760 mmHg such as, but not limited to methylated siloxanes. Solvent carriers are chosen based on their ability to solvate, carry or suspend expandable graphite and other optional materials that comprises the flame retardant surface infusion coating.

An "emulsion" is defined herein as a fine dispersion of minute droplets of one liquid into another, into which it is not soluble or miscible. Emulsions in this context are chosen based on their ability to solvate, carry, or suspend expandable graphite and other optional materials that comprise a flame retardant surface coating applied by infusion, spraying, or other process. The emulsifier package is chosen based on its Hydrophile-Lipophile properties (HLB) for solubilizing, carrying, or suspending expandable graphite and other optional materials that comprise the flame retardant surface infusion coating.

A "salt" as defined herein is an ionic compound formed by the reaction of an acid and a base and can be alkali (basic), acidic, or neutral. Types of salts include, but are not limited to, any combination of salt-forming cations such as, but not limited to, ammonium, calcium, iron, magnesium, potassium, pyridinium, quaternary ammonium, and sodium and salt-forming anions to form salts such as, but not limited to, acetates, carbonates, chlorides, citrates, cyanides, fluorides, nitrates, nitrites, oxides, phosphates, sulfates, and the like.

An "extender" is defined herein as a chemical substance that is added to a coating to alter properties such as color, durability, cost, and resistance to corrosion or wear and could include, but is not limited to, synthetic, natural, ground, or precipitated grades of talc powder or combinations thereof; calcium carbonate, barium sulfate, magnesium sulfate, mica, titanium dioxide, and the like.

A "stabilizer" can refer to a surfactant as defined above, a pH adjuster (defined as any salt or other compound added to adjust the pH of the coating), a dispersing agent (defined as a material that improves the dispersion of the solid or emulsified particles in the coating), a thickening agent (defined as a material that acts to adjust the viscosity of the coating), a catalyst (defined as a substance that increases the cross-linking or chemical adhesion ability of the coating), or other such material used to adjust the chemical or physical properties of the mixture.

A topical flame retardant coating is one means of enhancing flame retardant capability of a material or article. Flame retardant surface-infused coatings may be applied as a post-treatment by spray, roll coat, and other such common methods of surface coat application. Indeed, in one non-limiting embodiment the methods described herein are "post-treatment" in that the expandable graphite layer is formed after the flexible foam body is formed. That is, it is not a process where the expandable graphite is present in the foam before the foam is fully cured, i.e. an insitu process. Thus, the present methods are distinct from those disclosed in U.S. Patent Application Publication No. 2011/0241248. The flame retardant surface-infused coating is usually applied after the polyurethane foam or latex foam reactions have taken place, but it can also be applied to the surface of a mold such that it will adhere to the polyurethane or latex foam surface when demolding occurs.

Composition

Expandable Graphite

Expandable Graphite, sometimes abbreviated as EG or XG, is defined as an intercalated synthesized compound of graphite that expands or exfoliates when exposed to a rapid increase in temperature. In one non-limiting embodiment, the average particle size of the expandable graphite ranges from about 0.01 independently to 10,000 µm; alternatively from about 0.1 independently to about 5,000 µm; in another non-restrictive version from about 1 µm independently to about 1000 µm. When the word "independently" is used herein with respect to a range, it means that any threshold may be combined with any other threshold to give a suitable range. In a non-restrictive example, a suitable average particle size range is from about 0.01 µm to about 1000 µm.

The proportion of expandable graphite in the flexible foam composition product ranges from about 0.01 wt % independently to about 99.99 wt %; alternatively from about 0.1 wt % independently to about 50 wt %; in another non-limiting embodiment from about 0.5 wt % independently to about 30 wt %. In a different non-restrictive version, these may be the content ranges of the expandable graphite layer itself. The flame retardant layer or coating may also be applied to flexible foams having no EG or other flame retardant in the substrate foam.

Optional Additional FR Materials

Additional, optional FR materials and additives could include, but are not limited to, polyvinyl chloride (PVC), melamine, aluminum hydroxide, aluminum trihydrate (ATH), magnesium hydroxide (brucite), huntite, hydromagnesite, tetrabromophthalic anhydride (TBPA), chlorendic anhydride, tris(1,3-dichloro-2-propyl) phosphate (TDCPP), tris (2-chloro-iso-propyl) phosphate (TCIPP), polybrominated diphenyl ethers (PBDE), brominated cyclohydrocarbons, decabromodiphenyl ether (Deca-BDE or DeBDE), hexabromocyclododecane (HBCD or HBCDD), tetrabromobisphenol A (TBBPA or TBBP-A), polychlorinated biphenyl (PCB), anhydride-based polymers.

In one non-limiting embodiment, the proportion of optional, additional FR materials in the expandable graphite layer range from 0 independently to 70 wt %; alternatively from 0.5 wt % independently to 50 wt %.

Optional Extenders

Optional extenders may include, but are not necessarily limited to, synthetic/natural/ground/precipitated grades of talc, calcium carbonate, barium sulfate, magnesium sulfate, mica, titanium dioxide, and the like.

In one non-limiting embodiment, the proportion of optional, additional extenders in the expandable graphite layer range from 0 independently to 70 wt %; alternatively from 0.5 wt % independently to 50 wt %.

Solvents

Suitable aqueous solvents include water per se or water-based emulsions.

Suitable organic solvents include, but are not necessarily limited to, volatile organic solvents having a boiling point of less than about 392° F. (about 200° C.) at 760 mmHg such as, but not limited to, acetonitrile, acrylonitrile, 3-chloropropene (allyl chloride), benzene, benzyl chloride, bromodichloromethane, bromoethane (ethyl bromide), bromoform, bromomethane, 1,3-butadiene, n-butane, chlorobenzene, chloroethane, chloroform, chloromethane, carbon disulfide, carbon tetrachloride, 2-chlorotoluene, cyclohexane, dibromochloromethane, 1,2-dibromoethane, 1,2-dichlorobenzene, 1,3-dichlorobenzene, 1,4-dichlorobenzene, FREON® 12 (dichlorodifluoromethane), 1,1-dichloroethane, 1,2-dichloroethane, 1,1-dichloroethene, 1,2-dichloroethene (cis), 1,2-dichloroethene (trans), 1,2-dichloropropane, 1,3-dichloropropene (cis), 1,3-dichloropropene (trans), FREON® 114 (1,2-dichlorotetrafluoroethane), 1,4-dioxane, ethyl acetate, ethanol, ethylbenzene, 4-ethyltoluene, n-heptane, hexachloro-1,3-butadiene, n-hexane, isopropyl alcohol (2-propanol), isopropylbenzene (cumene), methylene chloride, 2-hexanone (MBK), 2-butanone (MEK), 4-methyl-2-pentanone (MIBK), methyl methacrylate, methyl-tertbutyl ether (MTBE), naphthalene, propylene, styrene, tertiary butyl alcohol (TBA), 1,1,2,2-tetrachloroethane, tetrachloroethene, tetrahydrofuran, toluene, 1,2,4-trichlorobenzene, 1,1,1-trichloroethane, 1,1,2-trichloroethane, trichloroethene, FREON® 11 (trichlorofluoromethane), FREON® 113 (1,1,2-trichloro-1,1,2-trifluoroethane), 1,2,4-trimethylbenzene, 1,3,5-trimethylbenzene, 2,2,4-trimethylpentane (isooctane), vinyl acetate, bromoethene (vinyl bromide), vinyl chloride, xylene (para and meta), xylene (ortho), xylene(mixed isomers), and combinations thereof. Alternatively, the organic solvent may be a semi-volatile solvent, comprising a boiling point between about 200° C. to about 500° C. at 760 mmHg such as, but not limited to methylated siloxanes. After formation, the organic solvent would volatilize in the curing process.

Adhesion Agents

The specific adhesion agents will vary with the particular embodiments. For instance, for the aqueous-based systems, the adhesion agent may be a water-based emulsion binder, like a latex paint or glue. Suitable water-based emulsion binders include, but are not necessarily limited to, acrylic polymer emulsions, styrene-butadiene latex, styrene-acrylic emulsion polymers including resin supported emulsions, vinyl-acetate based polymers such as vinyl acetate ethylene copolymers and vinyl acrylic latex, nitrile elastomers, natural latex, and combinations of these. For an organic solvent-based system, the organic solvent may contain a polymer, including, but not necessarily limited to, (SEBS) styrene-ethylene-butylene-styrene block copolymers, (SEPS) styrene-ethylene-propylene-styrene block copolymers, (SEEPS) styrene-ethylene-ethylene-propylene-styrene block copolymers, (SBS) styrene-butadiene-styrene block copolymers, (SIS) styrene-isoprene-styrene block copolymers, (S-EB/S-S) styrene-ethylene-butylene/styrene-styrene block copolymers, (S-EP/S-S) styrene-ethylene-propylene/styrene-styrene block copolymers, (S-EEP/S-S) styrene-ethylene-ethylenepropylene/styrene-styrene block copolymers, (SB) styrene-butadiene block copolymers, (SI) styrene-isoprene block copolymers, neoprene, and the like.

The proportion of adhesion agents in the composition that forms the expandable graphite layer may range from about 0.01 wt % independently to about 99.99 wt %; alternatively from about 0.1 wt % independently to about 50 wt %.

Optional Surfactants

A surfactant is necessary for the embodiment of a water-based solvent system. The surfactant improves the wettability of the product on the substrate flexible foam, and improves the stability of the emulsion. Suitable surfactants include, but are not necessarily limited to, anionic, non-ionic, cationic, polymeric, or electrosteric surfactants. Surfactants are not necessary for the hot melt embodiments or the organic solvent-based post-treatment embodiments.

In one non-limiting embodiment a suitable proportion of the optional surfactant in the water-based composition for forming the expandable graphite layer range from 0.01 wt % independently to about 5 wt %; alternatively from about 0.5 wt % independently to about 3 wt %.

Optional Plasticizing Agents

Optional plasticizing agents are not absolutely necessary for the coatings, but they can make the coating more flexible in the cases of the water- and solvent-based coatings. Suitable plasticizing agents include, but are not necessarily limited to, phthalate-based plasticizers comprising bis(2-ethylhexyl) phthalate, bis(2-propylheptyl) phthalate, diisononyl phthalate, di-n-butyl phthalate, butyl benzyl phthalate, diisodecyl phthalate, dioctyl phthalate, diisooctyl phthalate, diethyl phthalate, diisobutyl phthalate, di-n-hexyl phthalate, and other phthalate esters; adipate-based plasticizers based on bis(2-ethylhexyl) adipate, dimethyl adipate, monomethyl adipate, dioctyl adipate and the like; sebacate-based plasticizers; maleate-base plasticizers; trimellitate-based plasticizers such as tri(2-ethylhexyl) trimellitate; azelates-based; benzoate-based; organophosphate-based; glycols; glycol ethers; methyl rincinoleate; epoxidized soybean oil; epoxidized vegetable oils; epoxidized esters of vegetable oils; and combinations thereof. In particular, suitable plasticizing agents for water-based coatings are EASTMAN BENZOFLEX 50, EASTMAN BENZOFLEX 9-88, EASTMAN BENZOFLEX 9-88SG, EASTMAN BENZOFLEX 1046, EASTMAN EFFUSION™, EASTMAN DOM, EASTMAN OPTIFILM ENHANCER 400, EASTMAN TRIACETIN, EASTMAN TXIB, EASTMAN VELATE 262, EASTMAN VELATE 368, EASTMAN VELATE 375, and combinations thereof.

In one non-limiting embodiment a suitable proportion range for the optional plasticizing agents is from 0.1% independently to about 50 wt %; alternatively from about 1 wt % independently to about 30 wt %.

Optional Buffer Salts/pH Adjusters

In one non-limiting embodiment a suitable proportion range for the optional salts or pH adjusters is from 0% independently to about 2 wt %; alternatively from about 0.1 wt % independently to about 1 wt %.

Optional Stabilizers or Rheology Modifiers

In one non-limiting embodiment a suitable proportion range for the optional stabilizers is from 0% independently to about 5 wt %; alternatively from about 0.5 wt % independently to about 3 wt %.

One suitable, specific embodiment of the non-limiting embodiment using a water-based composition includes a water-based emulsion binder (e.g. a latex paint or glue) that contains the following solids: expandable graphite, another FR material (e.g. aluminum trihydrate, ammonium monophosphate, melamine), and a filler (e.g. talc, calcium carbonate, barium sulfate, diatomaceous earth, pearlite). The composition also contains a plasticizer to improve the flexibility of the coating, a surfactant to improve the wettability of the coating on the substrate and the stability of the liquid product (which forms an emulsion between the water and added plasticizer), and an antimicrobial package for product longevity. Nevertheless, the broader concept includes expandable graphite applied to the surface of flexible foams as a post-treatment and adhered in some manner to improve FR properties, not only the specific product composition previously just mentioned.

Other possible embodiments of achieving these compositions include, but are not necessarily limited to:

1) An organic solvent-based approach containing a polymer (SEBS, SBS, SEPS, etc.), a plasticizer to expand the polymer, and expandable graphite (and other FR solid, or not) solvated or suspended in an organic solvent.

2) A hot melt embodiment, where loose expandable graphite is applied to the surface of the substrate with a dry adhesive powder or beads, and subsequent application of radiation, e.g. heat, microwave, infrared (IR), and/or ultraviolet (UV) is applied to activate the adhesive and bind the particles to the surface. In one non-limiting embodiment the dry adhesive powder or beads may already contain XG within it. Suitable dry adhesive powder or beads include, but are not necessarily limited to, ethylenevinyl acetate (EVA) copolymers, ethylene-acrylate copolymers, polyamides, polyesters, polyurethanes, and combinations thereof. The proportion of adhesive powder or beads in the expandable graphite layer may range from about 0.01 wt % independently to about 99.99 wt %; alternatively from about 0.1 wt % independently to about 50 wt %.

3) A glue-on embodiment, where again loose expandable graphite is applied to the substrate surface along with spray-on glue (like that used in mattress constructions), and the glue is cured with heat, IR, and/or UV or other radiation, binding the particles to the surface. Suitable spray-on glues include, but are not necessarily limited to, water-based emulsion binders include, but are not necessarily limited to, acrylic polymer emulsions, styrene-butadiene latex, styrene-acrylic emulsion polymers including resin supported emulsions, vinyl-acetate based polymers such as vinyl acetate ethylene copolymers and vinyl acrylic latex, nitrile elastomers, neoprene, natural latex, and combinations of these; or organic solvent-based systems, where the organic solvent may contain a polymer, including, but not necessarily limited to, (SEBS) styrene-ethylene-butylene-styrene block copolymers, (SEPS) styrene-ethylene-propylene-styrene block copolymers, (SEEPS) styrene-ethylene-ethylene-propylene-styrene block copolymers, (SBS) styrene-butadiene-styrene block copolymers, (SIS) styrene-isoprene-styrene block copolymers, (S-EB/S-S) styrene-ethylene-butylene/styrene-styrene block copolymers, (S-EP/S-S) styrene-ethylene-propylene/styrene-styrene block copolymers, (S-EEP/S-S) styrene-ethylene-ethylene-propylene/styrene-styrene block copolymers, (SB) styrene-butadiene block copolymers, (SI) styrene-isoprene block copolymers, and the like; and layered combinations of water-based and solvent-based adhesives or coatings. The proportion of glue in the expandable graphite layer may range from about 0.01 wt % independently to about 99.99 wt %; alternatively from about 0.1 wt % independently to about 50 wt %.

The flexible foam composition can also be made by any one of a number of methods, or a combination of processes including, but not necessarily limited to the following:

coating at least one surface of the flexible foam body with the expandable graphite layer;

spraying the expandable graphite layer onto the at least one surface of the flexible foam body;

applying the expandable graphite layer to the surface of a mold in which the flexible foam composition is formed, although it should be understood that the EG layer may be applied to any surface to which a flexible foam body is subsequently contacted or formed upon;

applying the expandable graphite layer onto a first surface and pouring flexible foam-forming components onto the surface, where the surface could be a film or mold, where optionally the surface, film or mold transfers the EG layer onto a second surface by melt transfer;

introducing the flexible foam body into a reservoir of expandable graphite coating material, including, but not necessarily limited to dipping or soaking the foam body into a pool of expandable graphite-containing coating material;

gluing an expandable graphite layer and/or other flame retardant materials onto the at least one surface of the flexible foam body;

applying a hot melt composition comprising expandable graphite onto the at least one surface using a heated roller or other method;

applying solid expandable graphite to the at least one surface and subsequently applying an adhesive, such as a binder, to the solid expandable graphite in an amount effective to adhere the expandable graphite to the at least one surface;

frothing a mixture comprising expandable graphite and subsequently applying the mixture to the at least one surface employing a kiss-roll method;

applying a pre-made mixture of an elastomer binder comprising expandable graphite and a component selected from the group consisting of polyurethane, latex, polyethylene, polyurea, and combinations thereof to the at least one surface and subsequently curing the mixture;

adhering a relatively thin flexible foam layer having expandable graphite distributed throughout to the at least one surface of the flexible foam body, the thin flexible foam layer may have a relatively high level of expandable graphite therein;

applying a composition comprising neoprene and expandable graphite to the at least one surface of the flexible foam with a doctor blade or other tool;

spraying or roll coating the expandable graphite layer onto the flexible foam body surface;

spraying the expandable graphite layer onto the at least one surface and felting the layer with pressure and heat, similar to processes for spraying cellulose insulation;

applying the expandable graphite layer to the at least one surface in a thermoplastic coating;

applying the expandable graphite layer to the at least one surface where the expandable graphite layer additionally comprises at least one crosslinked elastomer; and applying a fabric to the flexible foam body where the fabric comprises an expandable graphite layer.

The viscosity of the composition used to form the expandable graphite layer will vary depending on the method of application. For instance, for a spray-on application, a suitable viscosity range is from about 10 cP independently to about 100000 cP; alternatively from about 10 cP independently to about 25000 cP. If the composition is to be rolled on the flexible foam as in a roll-coat embodiment, a suitable viscosity range is from about 10 cP independently to about 100,000 cP; alternatively from about 10 cP independently to about 25000 cP. The viscosity may be adjusted by adding more or less of the water, water-based emulsion, organic solvent, as appropriate for the particular embodiment.

In certain non-restrictive versions, the expandable graphite layer includes loose particulate expandable graphite and a dry adhesive, where it is understood that the EG particles are only initially loose and are fixed into place with the adhesive.

In one non-limiting embodiment, the flexible foams herein have a specific density of greater than 0.5 pounds per cubic foot (pcf) (greater than 8 kg/m$^3$), alternatively from about 0.7 independently to about 10 pcf (from about 11 to about 160 kg/m$^3$), and in another non-restrictive version from about 0.9 independently to about 7 pcf (about 14 to about 112 kg/m$^3$).

In one non-limiting embodiment the expandable graphite layer is present in an amount effective to retard the flammability of the flexible foam body. In another non-restrictive version of the compositions and methods herein, the expandable graphite layer in the flexible foam composition to be effective has a thickness ranging from between about 0.01 independently to about 10 mm; alternatively between about 0.01 independently to about 5 mm; in another version from about 0.1 independently to about 5 mm. To emphasize, while it is expected that in some non-restrictive cases the expandable graphite layer can be present at least partially within the flexible foam body, it is not necessary for the expandable graphite layer to be coextensive with the flexible foam body. It is expected that in most embodiments the expandable graphite layer would be relatively thin. Indeed, in another non-limiting embodiment the expandable graphite layer may be applied to a relatively thin flexible foam body where the expandable graphite layer is coextensive with the flexible foam body. Such relatively thin flexible foam body could then be applied to or adhered to another substrate, such as a flexible foam body, latex foam, or the like.

Alternatively, the expandable graphite layer may be present in a dry coating weight of from about 10 independently to about 25,000 g/m$^2$ applied (that is, once applied to the flexible foam body on a dry basis); alternatively from about 10 independently to about 12,500 g/in$^2$ applied; and in a different non-restrictive version from about 50 independently to about 5000 g/in$^2$ applied to give an layer effective to retard the flammability of the substrate.

In another non-limiting embodiment, the expandable graphite layer on or at least partially within the flexible foam composition generally has an open cell structure. In other words, the expandable graphite layer does not significantly change the porosity of the foam substrate. This is in contrast to a layer which seals or closes the open cells that the composition which forms the expandable graphite layer comes into contact with. By "open cell structure" is meant that not more than 50% of the air flow is inhibited by the expandable graphite layer, as compared to an otherwise identical flexible foam composition without the expandable graphite layer. In other non-limiting embodiments, the flexible foam composition may include some closed cells in the region or volume of the expandable graphite layer. Alternatively, the expandable graphite layer or coating could be applied to a closed-cell foam.

In another non-restrictive version, the expandable graphite layer may have closed cells, for example if the flexible foam body is latex foam or if the expandable graphite layer is applied to a molded skin surface, such as a pillow or other molded configuration.

While conventional FR materials may be used in some of the embodiments described herein, in other embodiments certain FR materials may be absent. In a non-limiting version, there may be an absence of phosphorous material, an absence of red phosphorus, an absence of melamine, an absence of melamine derivatives, an absence of halogenated FR materials, and/or an absence of boron-containing material. Stated another way, expandable graphite may be the only FR material, or may be the majority (>50 wt %) material used in conjunction with a second FR material not in this list, e.g. ATH. It is expected that in some embodiments the flexible foam compositions with the expandable graphite layer as described herein will meet all flammability requirements without halogenated or "clean" FR materials. Indeed, the methods and compositions herein may use very low coating levels while still allowing the polyurethane foam and latex foam products to pass burn tests, even Crib 5 and Source 2 for the UK, without the addition of any other FR materials besides expandable graphite infused or otherwise included in the foam.

In another non-limiting embodiment the expandable graphite layer may have an absence of ammonium and/or amine salts of metals in the second or third Groups of the Periodic Table. Examples of such metals include, but are not necessarily limited to, magnesium, calcium, zinc, and/or aluminum.

In a different non-restrictive version, the expandable graphite layer has an absence of cellulose or cellulose ether. Further, the expandable graphite layer has an absence of glass beads.

And in a different non-limiting embodiment, the expandable graphite layer is only applied to the surface of the flexible foam, in contrast to mixing the expandable graphite with the foam-forming components.

An unexpected advantage of the expandable graphite layer on the surface of the flexible foam is that the graphite layer does not affect the feel of the foam very much at all. That is, the graphite layer is noticeable primarily by sight rather than feel.

Applications

The list below shows some, but not all, of the applicable uses of at least one surface-infused gel layer and at least one layering substrate produced by the methods herein.

1. Mattresses, mattress topper pads, pillows, and bed-top products;
2. General furnishings and upholstered furniture including pet beds, cushions, armrests, seat-backs, foot-rests, decorative cushioning and functional support;

3. Use in medical applications such as wheelchair seat cushions and backs, orthopedic shoes, hospital beds, gurney pads, medical bed pads, medical supports and cushioning;
4. Use in conventional open- or closed-celled polyether polyurethane foam, reticulated polyurethane foam, high-resiliency polyether polyurethane foam, open or closed-celled viscoelastic polyether polyurethane foam, open- or closed-celled polyester polyurethane foam, open- or closed-celled polyester foam, latex foam, melamine foam for general cushioning, energy absorption, packaging, sealants and fillers;
5. Seat cushions, seat backs, headrests and armrests of chairs and seats for application in vehicles such as automobiles, motorcycles, bicycles, buses, aircraft, watercraft, tractors and other agricultural equipment such as combines, construction equipment and utility vehicles;
6. Carpet pad, whether virgin or rebond; as used herein "carpet pad" is considered cushioning;
7. Cushioning for sports equipment, including, but not necessarily limited to helmets and pads;
8. Personal protective equipment; and
9. Toys.

In another non-limiting embodiment, the methods and compositions described herein exclude any application of expandable graphite to fabrics, textiles, sheet-like structures.

The invention will be further described with respect to the following Examples, which are not meant to limit the invention, but rather to further illustrate the various embodiments.

Examples 1-23

Table I presents Burn Test results from various foam types that are uncoated or coated with the indicated amounts of a FR-100 expandable graphite additive available from Peterson Chemical Technology. The Burn Test protocol and the results are presented along with the pass criteria. It may be seen that in most cases the uncoated foam did not pass, but that the coated foam passed the applicable Burn Test. In some Burn Test names, the word "Standard" is abbreviated as "Std." Table II presents airflow data for Examples 1-4. Airflow loss for coated Examples 2, 3, and 4 was relatively low.

TABLE I

Burn Test Data

| Ex. | Coating Type | Substrate | Burn Test | Coating Thickness (g/m²) | Extinguish Time (s) | Notes | Results | Pass Criteria |
|---|---|---|---|---|---|---|---|---|
| 1 | Uncoated | Latex Foam | British Std 5852 Source 2 | N/A | N/A | Required water to be extinguished | FAIL | 1. Self Extinguish <2 minutes 2. Flame and smolder cannot extend past foam dimensions 3. No heat, smoke, or glowing past 60 minutes |
| 2 | FR-100 | Latex Foam | British Std 5852 Source 2 | 230 | 40 | Self-extinguished; satisfied all other requirements in order to pass burn test | PASS | |
| 3 | FR-100 | Latex Foam | British Std 5852 Source 2 | 190 | 45 | Self-extinguished; satisfied all other requirements in order to pass burn test | PASS | |
| 4 | FR-100 | Latex Foam | British Std 5852 Source 2 | 140 | >120 | Required water to be extinguished | FAIL | |
| 5 | FR-100 | Latex Foam Std Fabric | British Std 5852 Source 2 | 280 | 40 | Self-extinguished; satisfied all other requirements in order to pass burn test | PASS | |
| 6 | FR-100 | Latex Foam Std Fabric | British Std 5852 Source 2 | 230 | 40 | Self-extinguished; satisfied all other requirements in order to pass burn test | PASS | |
| 7 | FR-100 | Latex Foam Std Fabric | British Std 5852 Source 2 | 200 | >120 | Required water to be extinguished | FAIL | |
| 8 | Uncoated | PU Foam | British Std 5852 Source 2 | N/A | N/A | Required water to be extinguished | FAIL | |
| 9 | FR-100 | PU Foam | British Std 5852 Source 2 | 280 | 48 | Self-extinguished; satisfied all other requirements in order to pass burn test | PASS | |
| 10 | FR-100 | PU Foam | British Std 5852 Source 2 | 230 | 40 | Self-extinguished; satisfied all other requirements in order to pass burn test | PASS | |
| 11 | FR-100 | PU Foam | British Std 5852 Source 2 | 200 | 46 | Self-extinguished; satisfied all other requirements in order to pass burn test | PASS | |
| 12 | Uncoated | Visco 1 | British Std 5852 Source 2 | N/A | 50 | Self-extinguished; satisfied all other requirements in order to pass burn test | PASS | |
| 13 | FR-100 | Visco 1 | British Std 5852 Source 2 | 280 | 40 | Self-extinguished; satisfied all other requirements in order to pass burn test | PASS | |
| 14 | FR-100 | Visco 1 | British Std 5852 Source 2 | 230 | 40 | Self-extinguished; satisfied all other requirements in order to pass burn test | PASS | |

TABLE I-continued

Burn Test Data

| Ex. | Coating Type | Sub-strate | Burn Test | Coating Thickness (g/m²) | Extinguish Time (s) | Notes | Results | Pass Criteria |
|---|---|---|---|---|---|---|---|---|
| 15 | FR-100 | Visco 1 | British Std 5852 Source 2 | 200 | 40 | Self-extinguished; satisfied all other requirements in order to pass burn test | PASS | |
| 16 | Uncoated | Visco 2 | British Std 5852 Crib 5 | N/A | N/A | SE on surface ~8 minutes. Continued to smolder internally | FAIL | 1. Self Extinguish <10 minutes 2. Flame and smolder cannot extend past foam dimensions 3. No heat, smoke, or glowing past 60 minutes |
| 17 | FR-100 | Visco 2 | British Std 5852 Crib 5 | 310 | 390 | SE on surface ~6.5 minutes. Smoke stopped after 20 minutes. | PASS | |
| 18 | Uncoated | Visco 3 | British Std 5852 Crib 5 | N/A | N/A | Required water to be extinguished | FAIL | |
| 19 | FR-100 | Visco 3 | British Std 5852 Crib 5 | 390 | 510 | SE on surface ~8.5 minutes. Smoke stopped after 20 minutes. | PASS | |

TABLE 11

Airflow Data

| Ex. | Coating Type | Substrate | Airflow Test | Coating Thickness (g/m²) | Airflow (SCFM) | % Airflow Loss |
|---|---|---|---|---|---|---|
| 1 | Uncoated | Latex Foam | ASTM D3574 Test G | N/A | 2.61 | 0% |
| 2 | FR-100 | Latex Foam | ASTM D3574 Test G | 200 | 2.24 | 14% |
| 3 | FR-100 | Latex Foam | ASTM D3574 Test G | 260 | 2.13 | 18% |
| 4 | FR-100 | Latex Foam | ASTM D3574 Test G | 325 | 2.02 | 22% |

It will be appreciated that the polyols, polyisocyanates, and gelation catalysts can be those conventionally used for polyurethane flexible foams. Similarly, the components of the other flexible foam compositions mentioned herein may also be conventional, e.g. the latex foams. The flexible foam compositions may also contain useful amounts of conventionally employed additives such as stabilizers, antioxidants, antistatic agents, antimicrobial agents, ultraviolet stabilizers, phase change materials, surface tension modifiers such as silicone surfactants, emulsifying agents, and/or other surfactants, extender oils, solid flame retardants, liquid flame retardants, grafting polyols, compatible hydroxyl-containing chemicals which are completely saturated or unsaturated in one or more sites, solid or liquid fillers, antiblocking agents, colorants such as inorganic pigments or colorants, carbon black, organic colorants or dyes, reactive organic colorants or dyes, heat-responsive colorant, heat-responsive pigment, heat-responsive dye, pH-responsive colorant, pH-responsive pigment, pH-responsive dye and combinations thereof, fragrances, and thermally-conductive materials with thermal conductivity values in the range of 0.1 W/(m-° K) to 2000 W/(m-° K) such as talc; melamine; graphite, graphene, carbon black, carbon fiber and other carbon forms; metals in various forms and derivatives thereof where the metal is selected from the group consisting of aluminum, copper, iron, steel, titanium, silver, gold, platinum, nickel, rhodium, tin, iridium, palladium, osmium, ruthenium, zinc, cadmium, chromium, vanadium, molybdenum, rhenium, tantalum, niobium, tungsten, magnesium, and derivatives of these metals combined with an element selected from the group consisting of oxygen, halogens including, but not necessarily limited to, fluorine, chlorine, and bromine; carbon, silicon, sulfur, other metals, and combinations thereof; including, but not necessarily limited to, magnesium oxide, magnesium silicate, silicon carbide, boron nitride, sodium carbonate, sodium bicarbonate, calcium carbonate, barium sulfate, aluminum oxide, aluminum nitride, zinc oxide, ferric oxide, and titanium dioxide; diamond, metal flakes such as aluminum powder. Suitable examples of metal alloys include, but are not necessarily limited to, brass, bronze, electrum, steel, or combinations thereof. Suitable viscosity-modifiers include, but are not necessarily limited to, fumed silica and clays, xanthan gum and other polymers in minor amounts and the like to an extent not affecting or substantially decreasing the desired FR properties of flexible foams herein.

Addition of phase change materials to the flexible foam body allows the foam article to store or release large amounts of energy, which is higher than heat absorption or heat release by heat capacity alone. Heat is stored if the solid phase change material changes to a liquid, and heat is released when the liquid phase change material changes to a solid. In one non-restrictive version of the flexible foam compositions herein, the phase change materials should change phase in a range that helps transfer heat away from the expandable graphite layer. Thus, the phase change material could change phase in a range of from about 5° C. independently to about 100° C.; alternatively in a range of from about 20° C. independently to about 70° C. In one non-limiting embodiment suitable phase change materials include, but are not necessarily limited to, organic phase change materials such as n-tetradecane, n-hexadecane, n-octadecane, paraffin wax and others, inorganic materials such as salt hydrates and metallic PCMs, or mixtures of these types.

Alternatively, or in addition to the phase change materials discussed above, the flexible foam composition may contain phase change materials useful to move heat from a warm body, such as a human, that is lying on the flexible foam composition. The melting point temperature is usually chosen to be in the 20° C. to 35° C. range to match the human comfort zone. Once the solid phase change material melts completely, all of the latent heat is used, and the phase change material must be cooled back down below its melting point to solidify the phase change material and recharge for the next melt cycle. A non-limiting list of phase change materials in presented in Table 1 of U.S. Patent Application Publication No. 2013/0296449 for example purposes, incorporated herein by reference in its entirely. In one non-limiting embodiment, suitable phase change materials have a solid/liquid phase transition temperature from about −10° F. independently to about 220° F. (about −23° C. independently to about 104° C.). More preferably, the solid/liquid phase transition temperature is from about 68° F. independently to about 95° F. (about 20° C. independently to about 35° C.).

As discussed above, it has been discovered that flexible foam compositions disclosed herein may exhibit improved properties for fire retardant performance.

Many modifications may be made in the methods of and implementation of this invention without departing from the scope thereof that are defined only in the appended claims. For example, the exact foam-forming components, e.g. polyols, polyisocyanates, latex, foaming agents, gelation catalysts, expandable graphite types and sizes, and other additives, the proportions of these components used to make or treat the foams discussed herein used may be different from those used explicitly mentioned or suggested here. Additionally, techniques and methods for improving the properties and/or processing characteristics of polyurethane foam compositions and structures other than those specifically mentioned may find utility in the methods herein.

The words "comprising" and "comprises" as used throughout the claims is interpreted "including but not limited to".

The present invention may suitably comprise, consist or consist essentially of the elements disclosed and may be practiced in the absence of an element not disclosed. For instance, a flexible foam composition is provided that may consist of or consist essentially of: a flexible foam body having at least one surface, the flexible foam body selected from the group consisting of polyurethane flexible foam, latex flexible foam, and combinations thereof; and an expandable graphite layer on the at least one surface or at least partially within the flexible foam body adjacent the at least one surface. The expandable graphite layer can have an open cell structure or a closed cell structure.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "about" in reference to a given parameter is inclusive of the stated value and has the meaning dictated by the context (e.g., it includes the degree of error associated with measurement of the given parameter.

What is claimed is:

1. A flexible foam composition comprising:
   a cured flexible foam body having at least one surface, the flexible foam body selected from the group consisting of polyurethane flexible foam, latex flexible foam, and combinations thereof;
   an expandable graphite layer applied to the cured flexible foam body on the at least one surface, wherein the expandable graphite layer is adhered to the cured flexible foam body using an adhesion agent comprising a water-based binder, water and a surfactant;
   wherein the expandable graphite layer comprises expandable graphite, the water-based binder, water, the surfactant, an antimicrobial package, and at least one plasticizing agent selected from the group consisting of plasticizers based on phthalate, adipate, sebacate, maleate, trimellitate, azelate, benzoate, glycols, glycol ethers, epoxidized soybean oil, epoxidized vegetable oils, epoxidized esters of vegetable oils, and combinations thereof, and
   wherein the expandable graphite layer has an absence of a flame retardant material other than the expandable graphite.

2. The flexible foam composition of claim 1 wherein the expandable graphite layer comprises between 0.01 wt % and 99.99 wt % expandable graphite.

3. The flexible foam composition of claim 1 wherein the expandable graphite layer comprises between 0.1 wt % and 50 wt % expandable graphite.

4. The flexible foam composition of claim 1 wherein the expandable graphite layer is present in an amount effective to retard the flammability of the flexible foam body.

5. The flexible foam composition of claim 1 wherein the expandable graphite layer has a thickness between about 0.01 mm and about 10 mm.

6. The flexible foam composition of claim 1 wherein the expandable graphite layer is present in a dry coating weight of from about 10 g/m$^2$ to about 25,000 g/m$^2$.

7. The flexible foam composition of claim 1 wherein the expandable graphite layer comprises particulate expandable graphite having an average particle size between about 0.01 μm to about 10,000 μm.

8. The flexible foam composition of claim 1 wherein the expandable graphite layer comprises:
   between about 0.01 wt % and about 99.99 wt % water-based binder; and
   between about 0.01 wt % and about 99.99 wt % expandable graphite.

9. The flexible foam composition of claim 1 wherein the expandable graphite layer further comprises at least one filler.

10. The flexible foam composition of claim 1 wherein the expandable graphite layer comprises: between about 0.1 wt % to about 50 wt % of the at least one plasticizing agent; and between about 0.01 wt % to about 5 wt % of the surfactant.

11. The flexible foam composition of claim 1 wherein the expandable graphite layer further comprises at least one phase change material.

12. The flexible foam composition of claim 1 wherein the expandable graphite layer further comprises at least one thermally conductive material selected from the group consisting of talc; graphite, graphene, carbon black, carbon fiber; metals in various forms and derivatives thereof where the metal is selected from the group consisting of aluminum, copper, iron, steel, titanium, silver, gold, platinum, nickel, rhodium, tin, iridium, palladium, osmium, ruthenium, zinc, cadmium, chromium, vanadium, molybdenum, rhenium, tantalum, niobium, tungsten, magnesium, and derivatives of these metals combined with an element selected from the group consisting of oxygen, halogens, carbon, silicon, sulfur, and combinations thereof; magnesium oxide; magnesium silicate; silicon carbide; boron nitride; sodium carbonate; sodium bicarbonate; calcium carbonate; barium sulfate; aluminum oxide; aluminum nitride; zinc oxide; ferric oxide; and titanium dioxide; diamond; flakes of the aforementioned metals and derivatives and alloys thereof; and combinations thereof.

13. The flexible foam composition of claim 1 wherein the expandable graphite layer has an open cell structure.

14. A flexible foam composition comprising:
a cured flexible foam body having at least one surface, the flexible foam body selected from the group consisting of polyurethane flexible foam, latex flexible foam, and combinations thereof;
an expandable graphite layer applied to the cured flexible foam body on the at least one surface, wherein the expandable graphite layer is adhered to the cured flexible foam body using an adhesion agent comprising a water-based binder, water and a surfactant;
wherein the expandable graphite layer comprises expandable graphite, the water-based binder, water, the surfactant, an antimicrobial package, and at least one plasticizing agent selected from the group consisting of plasticizers based on phthalate, adipate, sebacate, maleate, trimellitate, azelate, benzoate, glycols, glycol ethers, epoxidized soybean oil, epoxidized vegetable oils, epoxidized esters of vegetable oils, and combinations thereof,
wherein the expandable graphite layer has an absence of a flame retardant material other than the expandable graphite, and
wherein the expandable graphite layer is present in a dry coating weight of from about 10 g/m$^2$ to about 25,000 g/m$^2$, and wherein the expandable graphite layer comprises particulate expandable graphite having an average particle size between about 0.01 μm to about 10,000 μm.

15. The flexible foam composition of claim 14 wherein the expandable graphite layer is present in an amount effective to retard the flammability of the flexible foam body.

16. A flexible foam composition comprising:
a cured flexible foam body having at least one surface, the flexible foam body selected from the group consisting of polyurethane flexible foam, latex flexible foam, and combinations thereof;
an expandable graphite layer applied to the cured flexible foam body on the at least one surface, wherein the expandable graphite layer is adhered to the cured flexible foam body using an adhesion agent comprising at least one water-based binder, water and a surfactant;
wherein the expandable graphite layer comprises expandable graphite, the at least one water-based binder, water, the surfactant, an antimicrobial package, and at least one plasticizing agent,
wherein the expandable graphite layer has an absence of a flame retardant material other than the expandable graphite, and
wherein the expandable graphite layer is present in an amount effective to retard the flammability of the flexible foam body.

17. The flexible foam composition of claim 16 wherein the expandable graphite layer comprises between 0.01 wt % and 99.99 wt % expandable graphite.

18. The flexible foam composition of claim 16 wherein the expandable graphite layer comprises between 0.1 wt % and 50 wt % expandable graphite.

19. The flexible foam composition of claim 16 wherein the expandable graphite layer is present in a dry coating weight of from about 10 g/m$^2$ to about 25,000 g/m$^2$.

* * * * *